(12) United States Patent
Born

(10) Patent No.: US 6,419,977 B1
(45) Date of Patent: Jul. 16, 2002

(54) NUTRITIONAL MEAT EXTENDER COMPOSITIONS

(75) Inventor: Terri Alice Born, Shakopee, MN (US)

(73) Assignee: Novartis Nutrition AG, Berne (CH)

( * ) Notice: Subject to any disclaimer, the term of this patent is extended or adjusted under 35 U.S.C. 154(b) by 0 days.

(21) Appl. No.: 09/535,209

(22) Filed: Mar. 27, 2000

(51) Int. Cl.⁷ .................. A23L 1/30; A23L 1/304; A23L 1/317
(52) U.S. Cl. ............ 426/646; 426/72; 426/74; 426/549; 426/573; 426/583; 426/588; 426/646
(58) Field of Search .................. 426/646, 573, 426/583, 549, 588, 72, 74

(56) References Cited

U.S. PATENT DOCUMENTS

| | | | | |
|---|---|---|---|---|
| 5,589,215 A | * | 12/1996 | Tang | 426/549 |
| 5,654,028 A | * | 8/1997 | Christensen et al. | 426/646 |
| 5,948,462 A | * | 9/1999 | Atsuta et al. | 426/583 |

* cited by examiner

*Primary Examiner*—Helen Pratt
(74) *Attorney, Agent, or Firm*—Michael U. Lee

(57) ABSTRACT

A novel meat extender composition for boosting the nutritional value of meat contains a four component dry mix system of whey protein concentrate, maltodextrin, a starch and non-fat dry milk. Additional vitamins, minerals, spices and a flavor enhancer may also be added to improve the organoleptic characteristics of the meat which is preferably ground or chopped for easier consumption.

1 Claim, No Drawings

NUTRITIONAL MEAT EXTENDER COMPOSITIONS

FIELD OF THE INVENTION

The present invention relates generally to food additives, bulking agents and the like which alter the constituency or texture of the food product to which they are added. More specifically, the present invention relates to nutritional meat extender compositions which have been modified to alter the texture or grain of meat preparations while at the same time fortifying the meat with additional nutrients for patients in need of same.

BACKGROUND OF THE INVENTION

Today's health conscious society is continually demanding better tasting, low calorie and low fat food products. Present FDA regulations require that any lean or low fat products contain no more than 10% fat. However, in fresh ground meat products, when fat is reduced the water content is increased proportionately. This has a direct effect on the meat product's texture and color and can ultimately affect the meats' flavor and taste as well. In nearly all food products, fat contributes to flavor, texture and mouthfeel of the food in question and consequently its reduction has a direct (usually negative) effect on the foods acceptability.

One of the major problems that occurs with respect to meat texture when fat is removed is that the toughness of the product is significantly increased. Soy protein in particular has been used as partial fat replacer with limited success in sausages and other ground meat products due to the off-taste attributable to the soy. Certain gums such as carrageenan, guar and carboxymethyl cellulose have also been used to reduce the water content but these have generally been found to be detrimental to the meat's texture.

Polysaccharides, such as polygalactomannans and their derivatives, are well known compositions which have many uses as thickening agents in aqueous systems. They are polysaccharides composed principally of galactose and mannose units that are usually found in the endosperm of leguminous seeds such as guar, locust bean, honey locust, flame tree and the like. Guar gum for example, is composed mostly of a polymannan with single-membered galactose branches. The ratio of glactose to mannose units in the guar polymer is 1:2.

Locust bean gum, also known as carob-seed gum, is a polygalactomannan of similar molecular structure in which the ratio of galactose to mannose is 1:4. Guar and locust bean gums are the preferred sources of the polygalactomannans, principally because of their commercial availability. Extracted from carob seeds of the tree *Ceratonia siliqua*, locust bean gum has a molecular weight of about 310,000. The gum swells in cold water, but its viscosity increases when heated. It is commonly added to food as a thickener, stabilizer or emulsifier primarily in dairy products, confections and sauces.

Xanthan gum is a synthetic, water soluble bipolymer derived from the fermentation of carbohydrates by several bacterial species of the genus Xanthomonas and is also useful as a thickening and suspension agent in numerous applications. It is stable in both strongly acidic and basic conditions and is also heat stable, thereby being useful in many chemical, pharmaceutical and in particular, food applications such as dairy products, beverages and high protein foods.

Xanthan gum displays poor wettability properties however and is very difficult to disperse in water and/or hydrate. A high degree of shear is usually necessary to wet each gum particle in order to disperse it into solution. It is preferably produced as a dry particle for use in storage prior to end use application and therefore it would be advantageous to develop a substantially dry, dust-free xanthan gum composition that is readily hydratable when ready for use.

Many meat preparations call for the shredding, chopping or grinding of the beef, pork or veal tissue into a homogenous mass that may be formed and cooked into a texture that is easily chewed and ingested such as hamburger or ground chuck sirloin. Additives of various proteins, starches, spices and seasonings have been created such as Hamburger Helperg by General Foods which give increased bulk to the ground beef and thereby enables one to prepare a greater volume serving using less beef per se.

U.S. Pat. No. 5,902,797 to Bell, et. al. discloses a nutritional formula for the treatment of children with attention deficit disorder. The composition is comprised of a carbohydrate source (5–25 gm), a protein source (1–25 gm), and a fat source (1–10 gm). The carbohydrate is selected from the group consisting of corn starch, high fructose corn syrup, maltodextrin, sucrose, dextrose, maltose and the like. The protein source is selected from the group comprising whey protein, whey protein concentrate, sodium caseinate, soy protein and mixtures thereof. The fat source comprises long chain, medium chain and structured triglycerides, canola and soybean oil and any one of a number of vegetable oils. The formula can be administered and incorporated into baked goods, confections, dairy products and other foods that appeal to children.

U.S. Pat. No. 5,948,462 to Atsuta, et aL. teaches a method for the preparation of low fat sausages with the same juiciness, meat structure and taste as a full fat sausage. This is achieved through the incorporation of a heat-denatured whey protein in an emulsion consisting of an edible oil and fat selected from the group comprising palm oil, rapeseed oil, corn oil, cocoa butter, coconut oil, safflower oil, peanut oil and mixtures thereof. The whey protein/fat-oil emulsion is added to ground pork which is formulated into sausage as is known in the art.

U.S. Pat. No. 5,589,215 to Tang discloses and claims a fat mimetic composition consisting of starch, cellulose and protein. Optionally, a gum and flavoring may be added to enhance texture and flavor. The starch may be modified or unmodified and is selected from the group consisting of corn, rice, potato and/or wheat starch, tapioca dextrin and tapioca maltodextrin. The cellulose is selected from cellulose, cellulose gel and cellulose ether. The protein may include whey protein, whey protein concentrate, non-fat dry milk, rice and pea protein, gelatin and soya. The gum is selected from the group consisting of guar gum, carageenan, xanthan gum, alginate and mixtures thereof. The fat mimetic may be directly mixed into the food or delivered in solution as a beverage.

U.S. Pat. No. 5,549,905 to Mark, et al. teaches a nutritional enteral solution for pediatric patients with impaired nutrient absorption and/or reduced gastrointestinal tolerance. The formula consists of a hydrolyzed protein source such as hydrolyzed whey, a carbohydrate source comprising maltodextrin, corn starch and mixtures thereof; a lipid source comprising medium and long chain triglycerides such as soy, canola, residual milk fat, soy lecithin and mixtures thereof. The nutritional formula may optionally contain beta-carotene.

U.S. Pat. No. 5,284,674 to Fazio claims a powdered dairy creamer composition consisting if one or more edible fats (5%–45 wt. %), non-fat dry milk solids (5 wt. % to 75 wt. %), a hydrophilic emulsifier (0.1 wt. %–1.0 wt. %) a lipophilic emulsifier (0.05 wt. % 0.5 wt. %) and an emulsion stabilizer. The edible fat can comprise one or more unsaturated vegetable oils (canola, soybean, palm oil, etc.) The hydrophilic emulsifier is sodium stearoyl-2-lactolate while suitable lipophilic emulsifiers are one of a number of polysorbates such maltodextrins, corn syrup solids, lecithin, whey and the like. The components are formulated as an emulsion which is subsequently dried.

U.S. Pat. No. 5,171,603 to Singer, et aL teaches a reduced fat food product in which microparticulated protein is used as a fat or oil replacement. The microparticulated protein is actually aggregated particles of denatured protein with a particle size range of 0.1 u to 2.0 u made from egg whites, casein, whey protein and mixtures thereof. The fat replacement composition may be incorporated in cheeses, puddings, sauces, soups, ice cream, confections and the like.

U.S. Pat. No. 4,701,445 to Schul discloses a process that enhances the dispersibility of agglomerated hygroscopic powders such as pre-gelatanized starch, whey protein, maltodextrin and whole or skim milk extracts. The hydroscopic powders' dispersibility is improved by mixing them with fibrous cellulose.

U.S. Pat. No. 4,156,021 to Richardson discloses a food substitute that simulates a natural food that is comprised of a major portion of fibrous cellulose particles, a natural oil such as vegetable oil and a hydrocolloid binder or mucilage such as guar gum, locust bean, carrageenan and other polygalactomannans. Appropriate flavor agents, colorants, emulsifiers and the like may be added according to taste and the type of food to be substituted.

U.S. Pat. No. 4,348,420 to Lynch, et al. discloses the use of a hydrocolloid and a water soluble protein such as sodium caseinate, potassium caseinate or whey protein as a binder in pulverized meat applications such as hot dogs, sausages and cold lunch meat loaves. The hydrocolloid is selected from the group consisting of algin, carrageenan, guar gum, carboxymethyl cellulose and the like in amounts of from about 0.5% to 50% of the total weight of the binder. Xanthan is briefly mentioned by not claimed. The water-soluble protein adds nutritional value to the final product while the hydrocolloid functionally serves as a binder which holds the pulverized meat particles together.

U.S. Pat. No. 4,563,360 to Soucie, et aL discloses the preparation of edible protein fiber complexes consisting of xanthan gum and a solubilized protein selected from the group consisting of soy protein, casein, egg protein, cottonseed protein, pea and sunflower protein and mixtures thereof. These fibers are then formulated into simulated meat products.

U.S. Pat. No. 4,894,250 to Musson, et al. teaches and claims thermoirreversable aqueous gels which simulate the texture of natural meat tissues. These are produced through the reaction of aqueous solutions of xanthan gum and glucomannan with heat under neutral to alkaline pH conditions. The gel texture can then be modified through the incorporation of other hydrocolloids such as agar, carrageenan, pectin and alginate or other food materials such as minced meat, vegetables, etc. to form the final product as desired.

In U.S. Pat. No. 5,049,401 to Harada, et al., xanthan gum is disclosed as being one of a number of suitable natural polysaccharides including, among others, carrageenan, locust bean gum, guar gum, alginic acid, agar and the like that together with hydrophobically encapsulated acidic and alkaline materials are combined with glucomannan resulting in its coagulation. This produces a low calorie food product that may be modified to simulate sausage and other comminuted meat products.

U.S. Pat. No. 5,139,800 to Anderson, et al. teaches the use of xanthan gum, among others, as a viscosity agent which, together with a colorant such as caramel or food grade dyes, an oil such as soybean or safflower oil and an emulsifier such as mono- and diglycerides provides a browning composition for meats such as chicken, beef, pork or fish when cooked in a microwave oven. U.S. Pat. No. 5,250,312 to Mason, et al. discloses a coating mix for retaining moisture in meat, poultry and seafood consisting of a hydrocollooid such as a carrageenan and either micro-milled or dissolved salt. The salt, together with carrageenan allegedly provides a rapid infusion of the mix into the food matrix while the carrageenan holds and binds water therein for a moist, juicy product after cooking.

U.S. Pat. No. 5,641,533 to Pedersen discloses a non-fat mayonnaise composition comprising a continuous aqueous phase with a semi-gelled system dispersed therein comprising a non-amidated or amidated galacturonic acid methyl ester with a degree of esterfication below about 55% that is used to replace most if not all the fat traditionally found in mayonnaise products. Despite the removal of fat, the mayonnaise is asserted to have the same organoleptic characteristics as full fat mayonnaise which is up to 80% fat.

U.S. Pat. No. 5,882,705 to Sato, et al discloses and claims the preparation of a micellar whey protein obtained by the limited hydrolysis of heat-denatured whey protein. The whey protein was added to an oil-in-water emulsion containing any one of a number of enumerated carbohydrates. The composition is said to be useful in the preparation of processed meats and other foods.

U.S. Pat. No. 5, 876,778 to Stewart teaches a fat imitator composition and method for its preparation comprising a complex carbohydrate, a simple carbohydrate, a proteinaceous material, a gum or hydrocolloid and a salt. Processed meats such as sausages, hamburgers, hot dogs, pepperoni, etc. are disclosed as suitable fat-containing foods. Carbohydrates include potato and tapioca starches, dextrins and/or cyclodextrins and numerous sugars including lactose, dextrose, corn syrup and the like. Proteinaceous materials include whey protein concentrate among others. The fat replacement material is formulated as a dry powder mix and can be added directly to the ground meat of the aforementioned processed meat products.

International PCT application No. PCT/AU89/00131 to Strong discloses and claims a dairy food substitute consisting of a polyunsaturated vegetable oil in a carbohydrate or protein matrix combined with a maltodextrin and an antioxidant formulated as a stabilized emulsion. The carbohydrate matrix is either starch or maltodextrin and the protein is preferably albumen. The composition is mixed with water and is a suitable replacement for milk and butter fat in a variety of foods.

U.K. Patent Application No. 2,229,077A to Kortum discloses a margarine with reduced fat content and a process for its preparation. The composition comprises a stabilized emulsion consisting of vegetable fats, animal fats, hydrocolloids, stabilizers and emulsifiers that are mixed in water which is added in an amount of 55 wt. % to 80 wt. %. Preferably, palm nut oil is the vegetable oil of choice and whey protein concentrate is used as the emulsifier. Carrageenan is added as the hydrocolloid and the pH of the system is maintained at a value of 4.8 to 5.8 through the addition of lactic acid. The reduced fat margarine so produced allegedly possesses organoleptic qualities very similar to that of full fat margarine and has the same consistency, flavor, appearance and spreadability.

None of the aforementioned prior art materials and/or processes refer to animal protein, including meat and preferably ground meat additive that not only adds additional nutritional benefits to the meat but also enhances the taste, texture and consistency of the ground meat product. These compositions are particularly useful in comminuted meat products such as ground beef, pork and veal that can be subsequently prepared as hamburger, sloppy joes and taco filling meat. The composition acts as a meat extender while maintaining a moist, juicy texture and good taste. Moreover, none of the prior art methods or compositions teach the realization of these goals in such a simple and straight forward manner.

SUMMARY OF THE INVENTION

The present invention is directed to the surprising and unexpected discovery that the addition of a small amount of a mixture of whey protein concentrate or isolate, non-fat dry milk, starch and maltodextrin in water to ground beef which is then thoroughly mixed and optionally frozen will provide a nutritionally-enhanced meat product that is moist and juicy and useful in a number of comminuted, reduced-fat meat applications such as sausages, taco meat, hamburger, hot dogs sandwich meat and spreads, sloppyjoes and the like.

DETAILED DESCRIPTION OF THE INVENTION

The animal protein to which the nutritional meat extender composition is added is preferably ground meat and may be selected from any one of the known types such as beef, pork, ham, veal, liver, poultry, fish and the like. Preferably, ground beef is the meat of choice and the ground up texture is obtained with a standard meat grinder as is known in the art. Not only can the meat enhancement compositions enhance the nutritional value of these meat products, but the compositions can also be used to reduce the fat content of many of these sources of protein as the compositions can also serve as fat replacement compositions.

The nutritional meat extender compositions are particularly beneficial for those individuals with nutrient absorption disorders and/or reduced gastrointestinal tolerance. The ground meat products containing these compositions deliver enhanced levels of protein in a more digestible form than the meat itself and sources of starch not usually found in meat sold in the market place. When used in ground meat, the nutritional meat enhancer provides a moist "quiche-like" texture while the meats retain their natural color and flavor.

The nutritional meat enhancer composition if the present invention is a four component dry powder mix consisting of whey protein concentrate or isolate, maltodextrin, a starch and nonfat dry milk. The composition affords enhancement of the nutritional levels of metabolites not otherwise found in meat, poultry, pork or fish. These are particularly of value to the elderly and the infirm who can benefit from the added nutrition in easy to chew and swallow ground or chopped meat portions.

The nutritional meat extender is formulated as a dry powder mix that can be incorporated in the meat product after cooking. The meat enhancer powder is generally added in an amount of from about one (1) tablespoon for every two (2) ounces of meat, or to suit an individuals taste. The meat enhancer can also be incorporated into pureed meat dishes traditionally served at nursing homes and hospital facilities for those patients who can't normally chew and swallow their food.

The ground meat enhancer comprises not only the whey protein concentrate or isolate, starch, maltodextrin and nonfat dry milk, but may also include additional spices and flavor modifiers to further erihance the organoleptic qualities of these meat products. These include, for example, seasonings and spices, such as onion powder, salt, pepper, vegetable oil, corn starch and tapioca starch, non-hygroscopic dried whey and the like. When all the ingredients are combined, a cream to off-white free flowing powder is prepared.

Optionally, vitamins, minerals and other excipients can be added to further boost the meat enhancers' nutritional value. Suitable vitamins include vitamins A, B, including $B_{12}$, C, K, D and E, riboflavin, niacin, folic acid, biotin, thiamine and mixtures thereof. Suitable minerals include phosphorus, calcium, iron, manganese, sodium, zinc, magnesium, potassium, iodide and mixtures thereof Preferably, the vitamins incorporated in the enhancer are vitamins A and C while calcium and iron are the minerals of choice. In addition, other ingredients, including antioxidants, isoflavones, fatty acids and edible oils may be added.

The whey protein concentrate and/or isolate comprises the major component of the nutritional meat enhancer and is incorporated in the mix in an amount of from about 10 wt. % to 50 wt. %, preferably 30 wt. % to 40 wt. % based on the total weight of the enhancer composition. Most preferably, the whey protein concentrate and/or isolate comprises from about 35 wt. % to 37 wt. % of the mix. The whey protein concentrate and/or isolate, aside from being a good source of added protein, also contains minor amounts of lactose, lactic acid and phosphoric anhydride.

The maltodextrin component is preferably a maltodextrin with a dextrose equivalent (D.E.) value of less than twenty (20), preferably of five (5) to fifteen (15) and more preferably about ten (10). The maltodextrin component of the meat enhancer comprises up to about 30 wt. %, preferably from about 10 wt. % to 20 wt. % of the total weight of the composition and more preferably is added in an amount of from about 15 wt. % –17 wt. %.

The third required component of the composition, non-fat, dry milk, provides volume and bulk to the nutritional meat enhancer composition. Preferably, this is a high-heat dried variety which is generally the most bland and lacks the musty off-tastes that often accompany other nonfat dry milk compositions. The non-fat dry milk component is incorporated in the enhancer in an amount of up to about 20 wt. %, preferably from about 10 wt. % to 15 wt. % based on the total weight of the composition. Best results have been obtained when the non-fat dry milk comprises about 11.5 wt. % of the composition.

The fourth required component of the nutritional meat enhancer product is a starch, preferably corn starch, which also serves as a bulking agent for added volume and texture. The corn starch component is generally comprised of a carbohydrate polymer having about twenty five percent (25%) amylase and seventy five percent (75%) amylopectin. In addition to finctionally acting as a bulking agent, the corn starch also serves as a source of glucose which is a readily metabolized sugar. The starch component is incorporated in the meat enhancer in an amount of up to about 30 wt. %, preferably from about 10 wt. % to 20 wt. % based in the total weight if the nutritional meat enhancer composition. Optionally, some of the corn starch component can be replaced with a different starch to modify the organoleptic bulking agent properties. Tapioca starch (Pregelon), rice, wheat and potato starches are suitable replacements in this regard and can replace up to 70 wt. % of the corn starch component.

The four basic components i.e., maltodextrin, whey protein concentrate, starch and nonfat dry milk generally comprise from about 75 wt. % to 100 wt. % of the nutritional meat enhancer composition. Preferably, an optional fifth component comprising one or more spices and other flavor enhancing excipients may be added for taste. The particular spice or spices chosen may be varied and is dependent upon the flavor desired. Suitable spices and flavor enhancing excipients include,. but are not limited to garlic, onion salt, black and red pepper, cajun seasoning, finely ground oregano, allspice, bay seasoning, cayenne, clove, cumin, dill, ginger, nutmeg, paprika, rosemary, sage and the like. Again, the spice component may comprise from about 0 wt. % to 25 wt. % of the nutritional meat enhancer composition.

Also, other ingredients known in the art such as edible oils and fats, starches, proteins and gums may be added to further vary the texture and flavor of the final meat product. Suitable oils include long and medium chain triglycerides, olive oil, vegetable oil, soybean oil, canola oil, palm oil, rapeseed oil, corn oil, safflower oil, coconut oil, peanut oil and mixtures thereof. Suitable protein additives include whey protein, soy protein, sodium caseinate and mixtures thereof. Starches useful as further additives include lactose, corn starch, maltodextrin, cellulose and its derivatives, high fructose corn syrup, sucrose, dextrose, maltose and the like. These may be added in the from of bread crumbs. Suitable gums include xanthan gum, carageenan, guar gum, alginate, carboxymethyl cellulose and mixtures thereof. These additional excipients can comprise from about 0.001 wt. % to about 5.0 wt. % of the meat enhancer composition.

The nutritional meat enhancer composition may be incorporated into un-ground melt and it is best applied to ground or chopped meat dishes such as hamburger, sausages, taco meat, sandwich meats (bologna, liverwurst), sandwich spreads (ham, chicken or tuna salad), sloppy joe, pork roll and the like.

The nutritional meat enhancer composition is prepared as a dry powder mix simply by blending the ingredients together in their respective amounts. The manner or succession in which the respective components are mixed is not critical although preferably the four required elements (whey protein, starch, non-fat milk and maltodextrin) are first combined to form a base while the other optional ingredients are added subsequently. The dry powder mix is incorporated into the meat product generally in an amount of up to about 3 tbsp, preferably from 0.5 to 1.5 tbsp. per 2.0 ounces of meat and more preferably in an amount of 1.0 tbsp. per 2.0 ounces of meat. Accordingly, 1.5 tbsp. of the enhancer would be used for 3.0 ounces of meat, 2.0 tbsp/4.0 ounces meat, etc. or may be seasoned to taste. The dry mix is added to the meat with water or broth and physically stirred therein.

The chopped or ground meat and nutritional meat enhancer dry mix compositions are mixed thoroughly to insure maximum dispersion of the dry powder mix throughout the ground beef. The composition can be added to the meat, cooked, and then frozen and stored until ready to use at room temperature or warmed to taste it or it can be mixed, cooked and consumed immediately. Without being bound to any theory, it is believed that in the frozen state, the meat particles become bound to one another by interactive tissue protein fibers and the ice crystals that form between the particles become discreet, uniformly sized and shaped pieces of meat that present a firm texture and mouthfeel that is well adapted for hamburger, sausage, processed meats, taco meat and sloppyjoe food applications.

The incorporation of the nutritional meat enhancer compositions into comminuted liver based products was also found to reduce the flavor intensity if the otherwise strong "musty" flavor tones associated with these and other generally bitter meats such as tongue, heart, jowl and the like. Beef patties made with the compositions of the present invention (0.25%) completely crumble when placed on the grill regardless of whether the beef was finely ground or of a coarse texture.

The following examples are provided to more fully describe and set forth the manner in which one skilled in the art may practice and appreciate the present invention. They are for illustrative purposes only, and it is understood that minor changes and variations can be made in the components and their amounts which are not specifically set forth herein. It is to be understood that to the extent any such variation does not materially change or alter the final product, it is still considered as falling within the spirit and scope of the present invention as later recited in the claims that follow.

EXAMPLE 1

A nutritional meal enhancer composition was prepared by dry mixing the following ingredients in their respective amounts.

| INGREDIENT | WEIGHT PERCENTAGE |
| --- | --- |
| WHEY PROTEIN CONCENTRATE, | 36.000 |
| MALTODEXTRIN 10 DE | 15.683 |
| NONFAT DRY MILK | 11.500 |
| SOUFFLE BREADING | 10.210 |
| PREGELON TAPIOCA STARCH | 8.000 |
| NON-HYGROSCOPIC, DRIED WHEY | 8.000 |
| CORN STARCH | 6.507 |
| ONION POWDER | 1.800 |
| GARLIC POWDER | 1.200 |
| SALT | 0.800 |
| GROUND BLACK PEPPER | 0.200 |
| VEGETABLE OIL | 0.100 |
| | 100.0% |

Sixteen (16) tablespoons of the nutritional meat enhancer prepared by dry mixing the above referenced ingredients was thoroughly blended into two (2) lbs. Of ground beef. The beef was then shaped into patties which were then frozen. Upon de-thawing and cooking, a hamburger was obtained that remained intact, did not crumble and was highly flavorfull and juicy.

What is claimed is:

1. A reduced fat meat composition comprising a ground meat, a whey protein component, a maltodextrin component, a starch component and a non-fat dry milk, wherein said whey protein component comprises between about 30 wt % to about 40 wt % and said maltodextrin component comprises between about 10 wt % and 20 wt % of the total weight of said whey protein component, said maltodextrin component, said starch component and said non-fat dry milk.

* * * * *